(12) United States Patent
Goodman et al.

(10) Patent No.: US 12,488,126 B2
(45) Date of Patent: Dec. 2, 2025

(54) METHODS FOR DYNAMIC PLATFORM SECURITY CONFIGURATION

(71) Applicant: Dell Products L.P., Round Rock, TX (US)

(72) Inventors: Bradley K. Goodman, Nashua, NH (US); Kirk Alan Hutchinson, Londonderry, NH (US); Joseph Caisse, Burlington, MA (US)

(73) Assignee: Dell Products L.P., Round Rock, TX (US)

( * ) Notice: Subject to any disclaimer, the term of this patent is extended or adjusted under 35 U.S.C. 154(b) by 260 days.

(21) Appl. No.: 18/046,584

(22) Filed: Oct. 14, 2022

(65) Prior Publication Data

US 2024/0126905 A1    Apr. 18, 2024

(51) Int. Cl.
    G06F 21/62        (2013.01)
    H04L 9/14         (2006.01)

(52) U.S. Cl.
    CPC ............ *G06F 21/6218* (2013.01); *H04L 9/14* (2013.01)

(58) Field of Classification Search
    CPC ........................................................ H04L 9/14
    See application file for complete search history.

(56) References Cited

U.S. PATENT DOCUMENTS

| 11,552,803 B1 | 1/2023 | Simkhada | |
| 2004/0193917 A1 | 9/2004 | Drews | |
| 2006/0236111 A1* | 10/2006 | Bodensjo | G07F 7/1008 |
| | | | 713/193 |
| 2014/0298040 A1 | 10/2014 | Ignatchenko | |
| 2015/0023183 A1 | 1/2015 | Ilsar | |
| 2017/0093815 A1 | 3/2017 | Chen | |
| 2019/0200405 A1 | 6/2019 | Gupta | |
| 2019/0384916 A1* | 12/2019 | Shah | G06F 21/575 |
| 2020/0213191 A1 | 7/2020 | Watsen | |
| 2020/0250293 A1* | 8/2020 | Paulraj | G06F 9/441 |
| 2020/0327231 A1* | 10/2020 | Smith | G06F 21/33 |
| 2021/0409231 A1 | 12/2021 | Fedorkow | |
| 2022/0303123 A1 | 9/2022 | Cabre | |

(Continued)

OTHER PUBLICATIONS

K. Watsen et al., "A Voucher Artifact for Bootstrapping Protocols", May 2018, Internet Engineering Task Force (IETF) Request for Comments: 8366 (Year: 2018), pp. 1-23.

(Continued)

*Primary Examiner* — Nicholas P Celani
(74) *Attorney, Agent, or Firm* — WOMBLE BOND DICKINSON (US) LLP (57) ABSTRACT

Systems, devices, and methods for managing data processing systems are disclosed. The data processing systems may be capable of operating in various manners. To manage the data processing systems, onboarding processes may be performed to conform the operation of the data processing systems to meet the expectations of owners of the data processing systems. To manage security policies of the data processing systems during onboarding, ownership vouchers may be generated to provide data necessary for onboarding that defines security policies, hardware policies, and ownership of the data processing systems. The ownership voucher may be deployed to data processing systems during onboarding to reduce the likelihood of undesired use and/or interactions with the data processing systems.

20 Claims, 6 Drawing Sheets

(56) References Cited

U.S. PATENT DOCUMENTS

| | | |
|---|---|---|
| 2023/0034615 A1 | 2/2023 | Detienne |
| 2023/0367489 A1 | 11/2023 | Dover |
| 2023/0370454 A1 | 11/2023 | Mohammed |
| 2023/0394493 A1 | 12/2023 | Rao |
| 2024/0007354 A1 | 1/2024 | Zoualfaghari |
| 2024/0039723 A1 | 2/2024 | Ito |
| 2024/0064028 A1 | 2/2024 | Fedorkow |
| 2024/0243967 A1 | 7/2024 | Singh |

OTHER PUBLICATIONS

"Detailed Protocol Description—Secure Device Onboard", Apr. 28, 2021, obtained online from <https://secure-device-onboard.github.io/docs/1.8.0/protocol-specification/detailed-protocol-description/>, retrieved on Jul. 13, 2024 (Year: 2021), pp. 1-30.

"Secure Device on board", 2020, obtained online from <https://secure-device-onboard.github.io/docs/1.9.0/>, retrieved on Oct. 11, 2024 (Year: 2020), 7 pages.

G. Cooper et al., "FIDO Device on board Specification 1.1", Apr. 19, 2022, obtained on line from <https://fidoalliance.org/specs/FDO/FIDO-Device-Onboard-PS-v1.1-20220419/FIDO-Device-Onboard-PS-v1.1-20220419.html>, retrieved on Oct. 11, 2024 (Year: 2022), 98 pages.

\* cited by examiner

METHODS FOR DYNAMIC PLATFORM SECURITY CONFIGURATION

FIELD

Embodiments disclosed herein relate generally to managing data processing systems. More particularly, embodiments disclosed herein relate to systems and methods to manage onboarding of a data processing system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing data processing systems. The data processing systems may provide computer implemented services. To provide the computer implemented services, the data processing system may need to operate in predetermined manner. These manners may be different for different persons and/or owners of data processing system.

To place the data processing system into compliance with the predetermined manners of operation, secure device onboarding (hereby referred to as "onboarding") of a data processing system may be performed. Onboarding a data processing system may place the data processing system in an operating state desired by a user, owner, or other person. Onboarding may permit the data processing system to be manufactured, warehoused, and sold, without any prior knowledge of which users, owners, and/or other persons will utilize the data processing system in the future.

To onboard a data processing system, various portions of data may be used by the data processing system. The data may be collected and used to obtain a package (e.g., an ownership voucher) that includes the data necessary to onboard the data processing system.

To reduce the likelihood of compromise of data processing system, the data processing systems and/or other system components may operate in accordance with a security framework. The security framework may provide a root of trust that defines authority over the data processing systems. The ownership vouchers may be implemented with certificates or other types of cryptographically verifiable data structures that allow for validation of policies specified by an ownership voucher prior to implementation by a data processing system.

By doing so, embodiments disclosed herein may reduce the likelihood of compromise of the data processing system may placing the data processing system in a restricted functionality state until onboarded. During onboarding, the operation of the data processing system (e.g., security policies) may be conformed to that expected by a new owner, as required by a system to which the data processing system is joining, and/or based on other requirements.

In an embodiment, a method for managing security of a data processing system is provided. The method may include deploying, by a management service, an initial security policy to the data processing system, the initial security policy comprising a public key of a first party and placing the data processing system into a first security state; generating, by the management service, an ownership voucher for the data processing system, the ownership voucher comprising a second security policy, the second security policy being signed and verifiable using the public key of the first party, and the second security policy specifying a change from the first security state; and deploying, by the management service and during an onboarding of the data processing system by a second party, the ownership voucher to the data processing system to update the data processing into a second security state specified by change from the first security state to place the data processing system in compliance with a security framework implemented by the second party.

The first security state may be hardened against attacks on the security of the data processing system, and the second security state may be less restrictive than the first security state.

The ownership voucher may also include a third security policy, the third security policy being signed and verifiable using a public key of the second party, and the third security policy specifying a change from the second security state.

The second security policy may also include a public key of the second party.

The public key of the second security policy may delegate authority over changes in security policies implemented by the data processing system to the second party, and the public key of the second security policy may require that any changes to the second security state be signed by the second party and verifiable with the public key of the second security policy.

The first party may be a manufacturer of the data processing system, and the initial security policy may secure the data processing system against compromise while in a channel of commerce.

The second party may be an owner of the data processing system after purchase from the channel of commerce, and the second security policy may place the data processing system into compliance with the security framework implemented by the owner.

The method may also include obtaining, by the management service, a second public key from the owner; obtaining, by the management service, information regarding the security framework implemented by the owner; generating, by the management service and using the second public key and the information, the second security policy; and generating, by the management service and using the second security policy, the ownership voucher, the ownership voucher may include the second security policy; an ownership certificate indicating that the owner owns the data processing system; a hardware certificate indicating configurations for hardware components of the data processing system; credentials for the data processing system to allow the data processing system to join a domain indicated by the owner; and a management agent that indicates a software component designated by the owner for the data processing system.

The initial security policy may specify a change in Extensible Firmware Interface (EFI) keys used to manage startup of the data processing system.

The initial security policy may also specify a limit on a manner in which the startup of the data processing system is performed.

In an embodiment, a non-transitory computer readable medium is provided. The non-transitory computer readable medium may include instructions which when executed by a processor cause the computer-implemented method to be provided.

In an embodiment, a data processing system is provided. The data processing system may include the processor and computer readable medium, and may perform the computer-implemented method.

Figure 1:
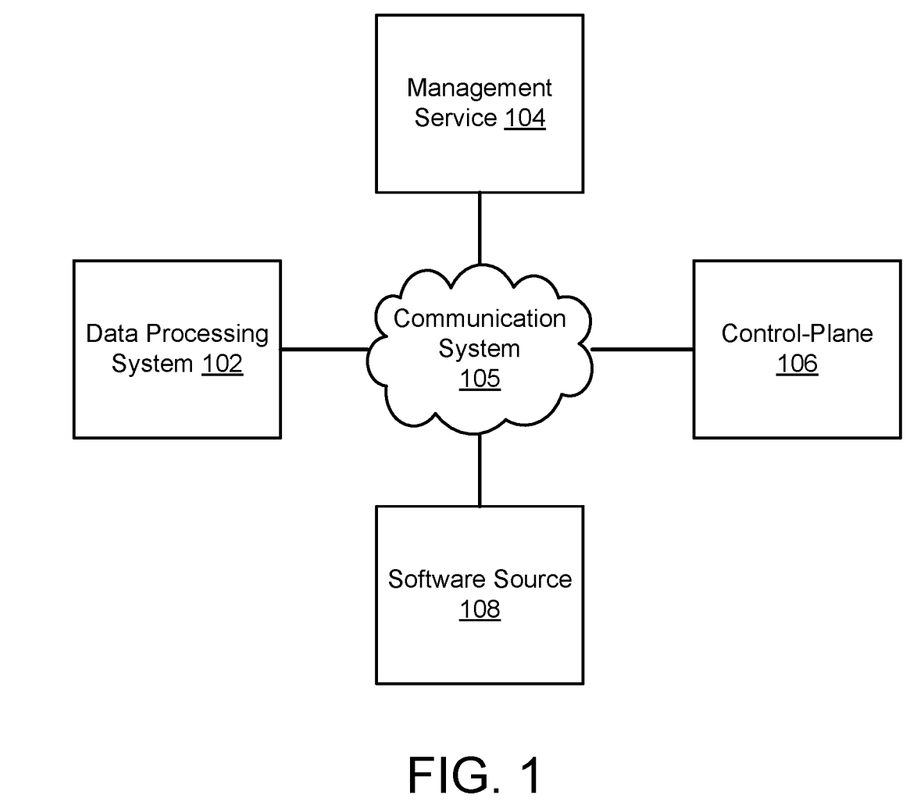
FIG. 1 shows a block diagram illustrating a system in accordance with an embodiment.

Turning to FIG. 1, a block diagram illustrating a system in accordance with an embodiment is shown. The system shown in FIG. 1 may provide computer implemented services. To provide the computer implemented services, the system may include any number of data processing systems (e.g., 102).

Overtime, additional data processing systems may need to be added to the system. For example, data processing systems may be added to the system to increase the available computing resources for providing computer implemented services, to replace existing data processing systems, and/or for other reasons.

To manage the system, an owner of the system may require that the data processing systems to-be-added to the system meet certain requirements. These requirements may relate to, for example, security requirements and/or other types of requirements. If a data processing system does not meet the requirements, adding it to the system may present risk to the system. For example, adding a data processing system to the system that does not meet the security requirements of the system may present risk of the data processing being more easily compromised by malicious parties. If compromised, the data processing system may be used to attack other components of the system thereby imperiling the system.

In general, embodiments disclosed herein provide systems, devices, and methods for securely providing computer implemented services. To securely provide computer implemented services, a framework for managing data processing systems to prior to, during, and/or after joining a system may be implemented. The framework may (i) limit risk of compromise of the data processing systems prior to joining a system, (ii) conform the data processing systems to security requirements implemented by the owner of the system during joining to the system, and (iii) facilitating, by the owner of the system, management of the data processing systems after the data processing systems join the system. By doing so, embodiments disclosed herein may reduce risk of compromise of systems that include data processing systems due to data processing systems added to the system.

To implement the framework, data processing systems may initially (e.g., at manufacturing) be placed in a more secure state of operation where their functionalities are limited (e.g., as defined by policies) to reduce risk of compromise. The data processing systems may then be late bound (e.g., when onboarded to a system of a purchaser) when added to a system (e.g., of a new owner). As part of the late binding process (e.g., during onboarding), the security policies that limited the functionalities of the data processing systems may be amended to place the data processing system in compliance with security policies of a system in which the data processing systems will operate.

To facilitate amending of security policies, the framework used to manage the data processing systems may be implemented using certificates (and/or other types of verifiable data structures) that define which entities have authority over the data processing systems. For example, when initially manufactured, certificates (i) indicating that the manufacturer has authority over a data processing system and (ii) specifying security policies to be implemented by the data processing system may be deployed (e.g., stored in storage) to the data processing system.

To modify authority over the data processing system, security policies implemented by the data processing system, and/or other policies implemented by the data processing system, certificates may be deployed to the data processing system. The certificates may specify changes to certificates already present on and implemented by the data processing system. Prior to implementing any changes specified by the certificates, the data processing system may validate the certificates and ascertain whether the certificates are signed by an entity that has authority to make the changes to the data processing system. If validated and appropriately signed, then the data processing system may implement the changes in its operation specified by the certificates.

To express which entities have authority to modify policies implemented by the data processing system, the data processing system may check to ascertain whether the policies are authorized for implementation (e.g., by checking signatures). A variety of different entities may have such authority over a data processing system including, for example, (i) an owner as defined by a secure onboarding policy, (ii) a manufacturer as defined by an onboarding policy, (iii) a key (e.g., public key of an entity) enrolled in a specific trusted processing hierarchy (e.g., a Platform hierarchy) that defines authorities, (iv) a key in an extensible firmware interface database (which may or may not be specifically tagged to allow for policy alterations), (v) a certificate initially deployed to the data processing system that includes a key which must be the signatory to any further policy alterations (and/or a root-signatory thereof), and/or (vi) another source of authority through which subsequently obtained certificates may be validated as being authorized by a root of trust (e.g., a manufacturer).

By doing so, embodiments disclosed herein provide computer implemented services that are less likely to risk compromise of a system. To provide this functionality, a system in accordance with an embodiment may include management service 104, control-plane 106, and software source 108. Each of these components are discussed below.

Management service 104 may provide information (e.g., an ownership voucher) usable to securely onboard data processing system 102 to a system. The information may include, for example, certificates that specify authority over data processing system 102. Management service 104 may provide the certificates at the time of manufacturing and/or at a time of transfer of authority over the data processing system 102 (e.g., as part of an ownership voucher).

Control-plane 106 may be part of a system to which data processing system 102 will join. For example, when data processing system 102 is purchased by a purchaser, the new owner of data processing system 102 may onboard the data processing system to a system (e.g., through late binding). As part of that onboarding processing, control-plane 106 may cooperate with management service 104 to provide data processing system 102 with an ownership voucher. The ownership voucher may include all of the information necessary to onboard data processing system 102 to the system.

Software source 108 may provide copies of images of applications and/or other types of software (and/or other types of data structures usable to instantiate executing entities on data processing system 102) to be hosted on data processing system 102 once onboarded to a system.

Figure 3:
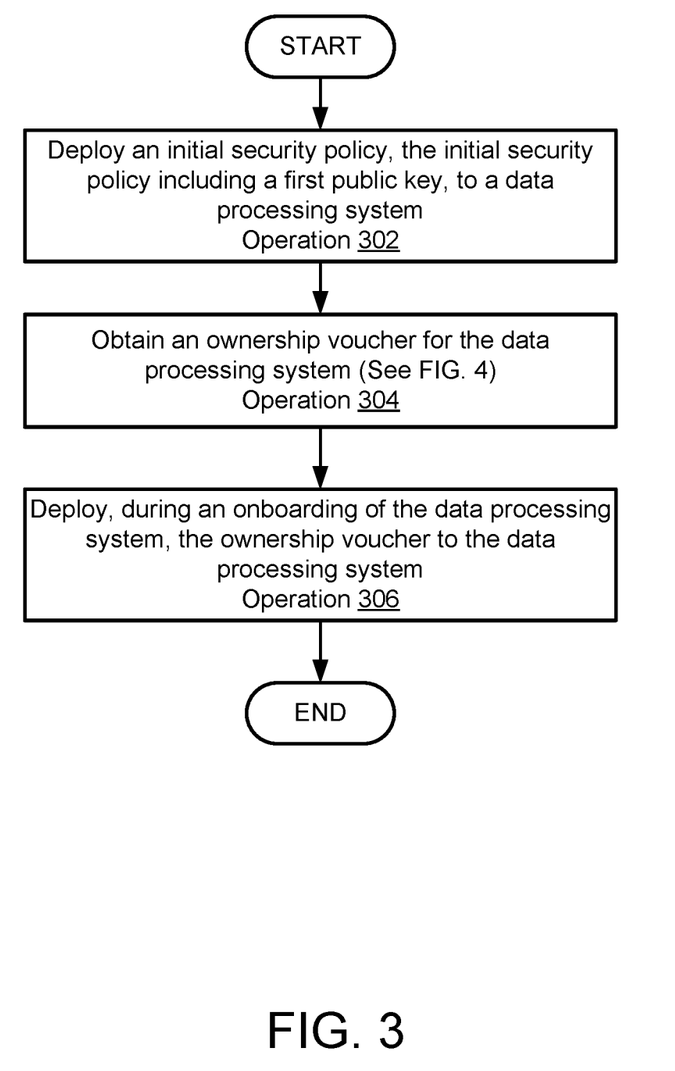
FIGS. 3-4 show flow diagrams illustrating methods for managing a data processing system in accordance with an embodiment.
Figure 4:
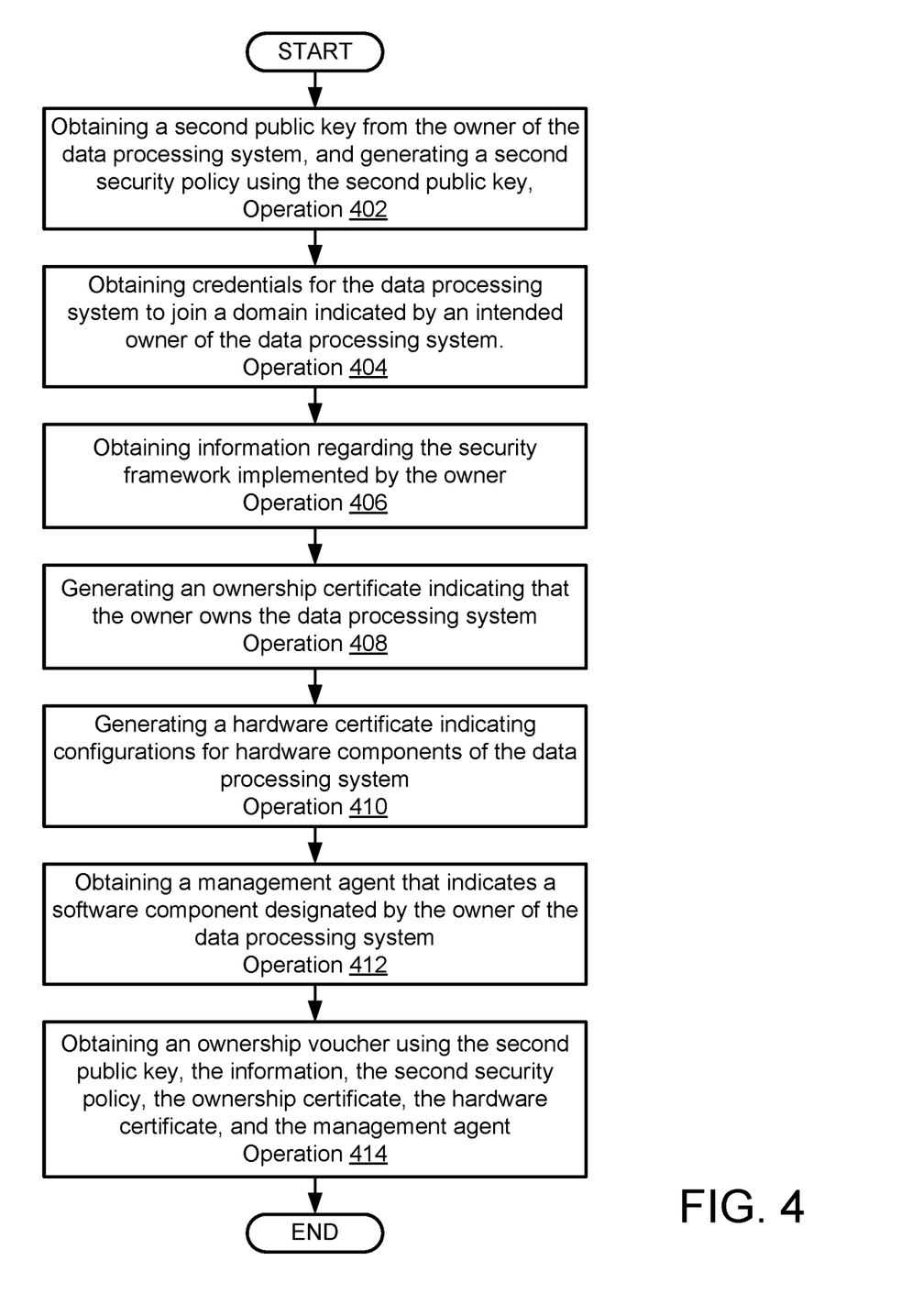

When providing its functionality, data processing system 102, management service 104, control plane 106, and/or software source 108 may perform all, or a portion, of the methods shown in FIGS. 3-4.

Figure 5:
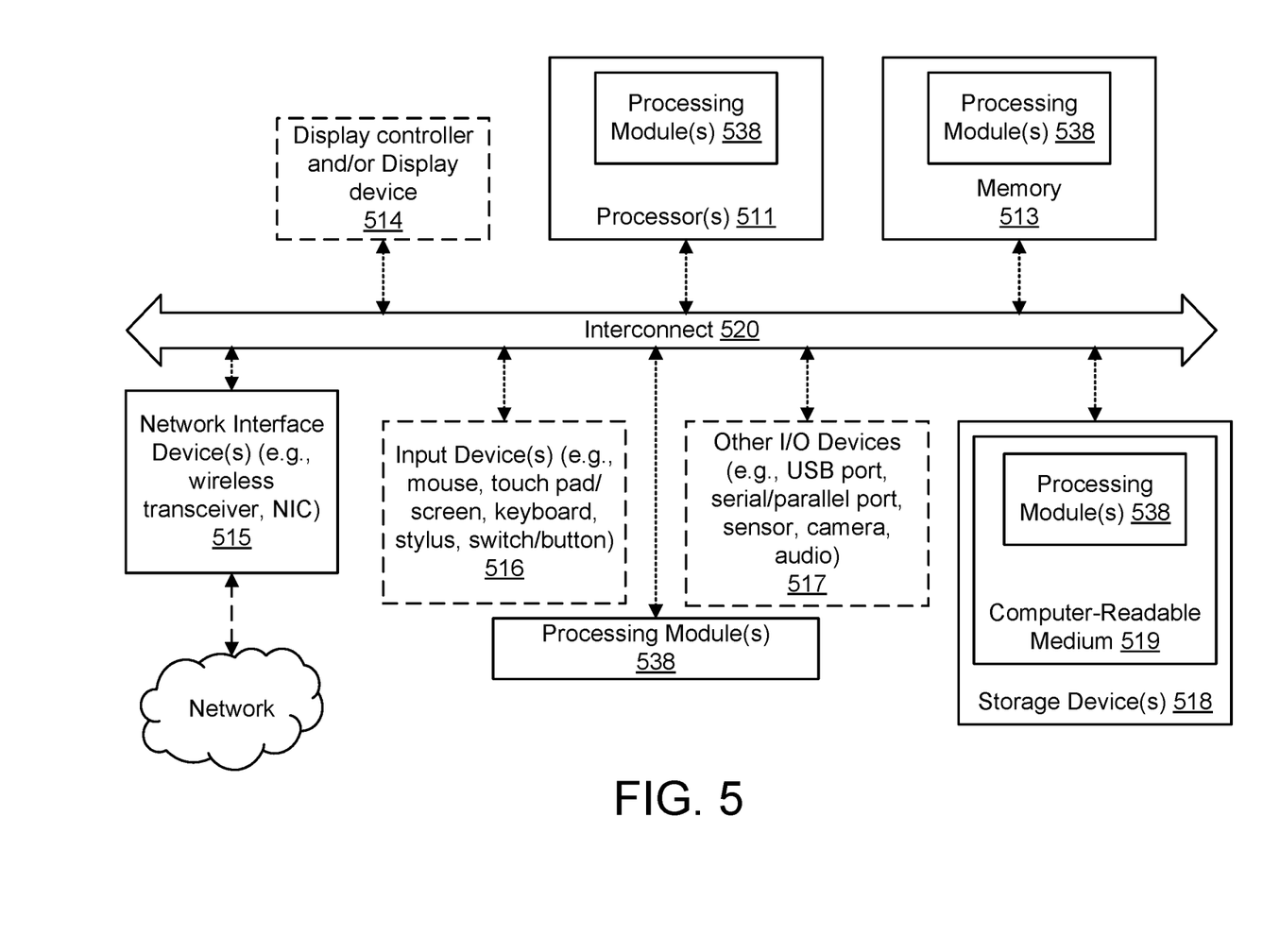
FIG. 5 shows a block diagram illustrating a data processing system in accordance with an embodiment.

Data processing system 102, management service 104, control-plane 106, and/or software source 108 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. Refer to FIG. 5 for additional information regarding computing devices.

Any of the components shown in FIG. 1, may be operably connected to each other (and/or components not illustrated) with communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Figure 2A:
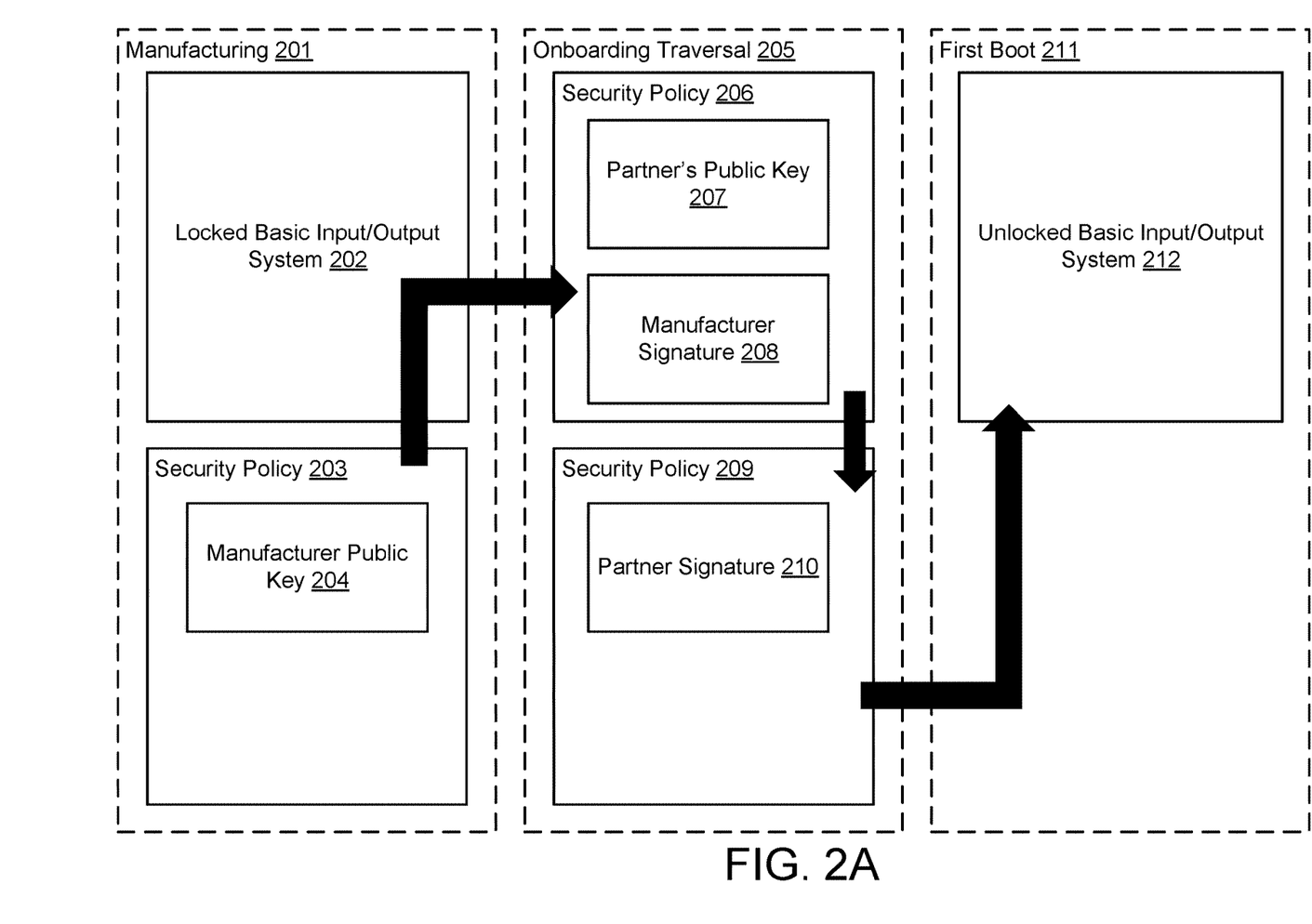
FIG. 2A shows a data flow diagram illustrating data flows and/or operations in a system over time in accordance with an embodiment.

To further clarify generation and use of security policies in ownership vouchers, a data flow diagram illustrating data flows (e.g., black arrows of FIG. 2A) in a system in accordance with an embodiment is shown in FIG. 2A.

Turning to FIG. 2A, temporal phases of adding a data processing system (e.g., 102) to a system in accordance with an embodiment is shown. These phases may include manufacturing 201, onboarding traversal 205, and first boot 211. Each of these phases are discussed below.

During manufacturing 201, the data processing system may be manufactured. As part of manufacturing, certificates may be deployed to the data processing system. These certificates may specify, as noted above, initial ownership, authority, security policies, and/or other operational/control characteristics of the data processing system.

To secure the data processing system between manufacturing and joining of a system, the security policies may specify that the data processing system is to implement a locked basic input/output system 202. The locked basic input/output system may restrict operations that may be performed during startup of the data processing system, software that may be hosted by data processing system, and/or other limitations on the operation of the data processing system that reduce risk of compromise of the data processing system. For example, locked basic input/output system 202 may limit booting of the data processing system, disable certain interfaces, and/or otherwise place restrictions that may limit the ability of malicious parties to attempt to compromise the data processing system. These restrictions may be specified by security policy 203, which may be implemented using a certificate signed by the manufacturer of the data processing system.

Security policy 203 may also include manufacturer public key 204. Manufacturer public key 204 may be used by the data processing system to validate certificates that allege to make changes to the operation of the data processing system. After manufacturing 201, the data processing system may enter into a channel of commerce. For example, the data processing system may be sold to resellers and then on to consumers.

Onboarding traversal 205 may begin when the data processing system enters the channel of commerce and ends after the end owner purchases the data processing system. The owner may have security requirements for data processing systems. To meet the security requirements, security policy 206 may be generated and deployed to the data processing system. Security Policy 206 may include a partner's (e.g., the intended owner's) public key 207 and/or changes (e.g., to make the data processing system more marketable) from the security policies specified by security policy 203. Security policy 206 may include manufacturer signature 208 which may be verified using manufacturer public key 204. Consequently, security policy 206 may be verified by the data processing system as being valid. By doing so, the manufacturer may delegate authority to change and/or manage security policies of the data processing system to the intended owner using security policy 206 (through further delegation of authority to an end user).

With the authority to change and/or manage security policies, the partner may generate security policy 209, which may define security requirements for the data processing system to abide by when onboarded to a system of an owner of the data processing system. Like security policy 206, security policy 209 may need to be verified prior to implementation. Security policy 209 may be signed with partner signature 210 and which is verifiable using partner's public key 207. Security policy 209 may specify changes to security policies 206 and/or 203. For example, security policy 209 may specify that boot options are to be unlocked thereby placing the data processing system in compliance with its owner's security expectations.

By doing so, when the owner of the data processing system commences first boot 211, the data processing system may be in a second security state. The second security state may be less restrictive than the first security state as required by the manufacturer. For example, the data processing system may implement unlocked basic input/output system 212, which may allow the users of the data processing system to implement different types of boots. While in the second security state, the data processing system may provide the computer-implemented services while complying with the owner's security expectations.

Figure 2B:
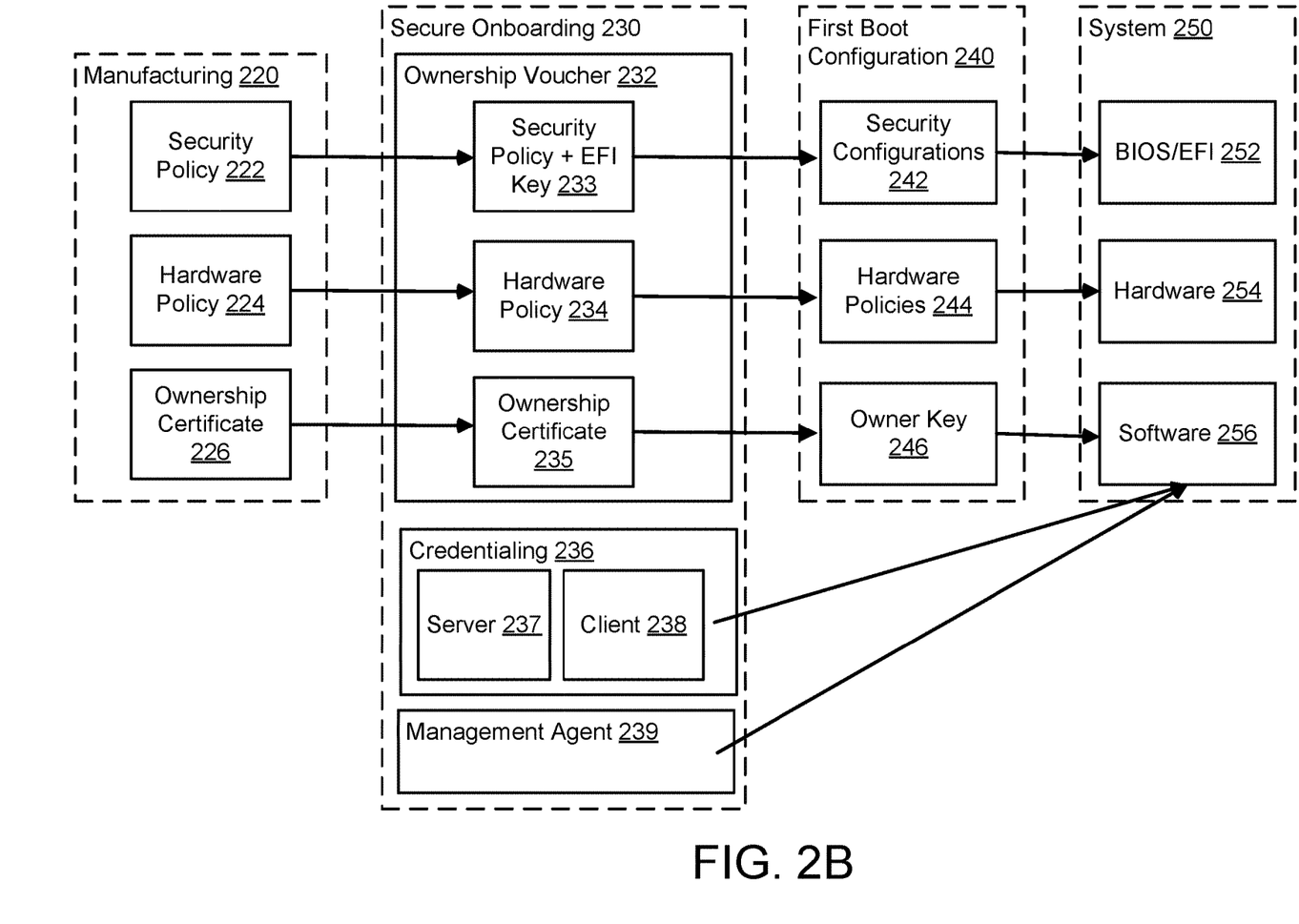
FIG. 2B shows a block diagram illustrating data structures used during onboarding of a data processing system in accordance with an embodiment.

Turning to FIG. 2B, data structures usable by components of the system of FIG. 1-2A are shown. Any of these data structures may be implemented using, for example, lists, tables, databases, linked lists, and/or other type of data structures. Any of the data structures may be shared, spanned across multiple devices, and may be maintained and used by any number of entities. Additionally, while illustrated as including a limited amount of specific data, any of these data structures may include additional, less, and/or different data without departing from embodiments disclosed herein.

Turning to FIG. 2B, a diagram illustrating data structures and interactions between system components in accordance with an embodiment is shown. The processing illustrated in FIG. 2A may be implemented as part of the process illustrated in FIG. 2B. For example, the diagram shown in FIG. 2B may illustrate a process through which the data structures may be used to complete an onboarding of a data processing system and through which the data processing system may be placed into compliance with an owner's security expectations.

Now, consider a scenario as shown in FIG. 2B in which a manufacture constructs data processing system 102 through a process of manufacturing 220. As part of manufacturing 220, various certificates (222-226) may be stored on data processing system 102 and that define security policies, hardware policies, and ownership of data processing system. Generally, these policies may be restrictive to reduce the likelihood of undesired use and/or interactions with data processing system 102. For example, the resulting security policies may limit the ability of data processing system 102 to be booted, may define which pieces of software may be executed by data processing system 102 (e.g., extensible firmware interface (EFI) keys), etc. The certificates may also define who has authority to make changes to these restrictions.

After manufacturing 220, data processing system 102 may be purchased and an intended owner may wish to conform the operation of data processing system 102 to meet certain criteria. To do so, the intended owner may wish to perform an onboarding of data processing system.

To onboard data processing system 102, secure onboarding 230 may be performed. As part of secure onboarding 230, various data structures including ownership voucher 232, credentialing 236, and management agent 239 may be used.

Ownership voucher 232 may include the various certificates (e.g., 233-235) that may delegate authority over data processing system 102 to another party and/or may modify the security policies and/or hardware policies defined by the certificates (e.g., 222-226) deployed by the manufacturer. The authority delegated by the manufacturer may not remove the manufacturer as the root of trust. Rather, the manufacturer may retain its authority over data processing system 102 including, for example, the ability to revoke the delegated authority. The ownership voucher may be obtained, for example, from a management service (e.g., management service 104 from FIG. 1) of the data processing system's manufacturer, a partner, or another entity.

Ownership voucher 232 may delegate authority by including certificates that are verifiable by data processing system 102. The certificates may be cryptographically signed. The certificates may include, for example, (i) security policy+ EFI key 233 that may modify (e.g., updates, changes, etc.) previously implemented security policies (e.g., security policy 222), (ii) hardware policy 234 that may include secure component validation (SCV) information to validate the integrity of the hardware of data processing system 102 (e.g., verify that the data processing system has not been tampered with since the generation of hardware policy 224 during manufacturing of the computing device), and (iii) ownership certificate 235 which may include information about the data processing system's intended owner.

The ownership voucher 232 may be utilized along with credentialing 236 to permit data processing system 102 to join a domain and/or access to a control-plane through which data processing system 102 may be further managed. Credentialing 236 may include both server 237 credentials and/or client 238 credentials. Server 237 credentials and/or client 238 credentials may be credentials obtained from the control-plane (e.g., 106) that will be used by an owner to manage it.

Management agent 239 may also be utilized along with the ownership voucher 232 and credentialing 236. The management agent 239 may identify a location (e.g., a URL) from which a software loadout (required for onboarding) is to be obtained. Credentialing 236 and management agent 239 may be obtained from a future owner of the data processing system.

Secure onboarding 230 may place data processing system 102 in condition to operate in a manner as expected by an owner. For example, the changes in security policies as defined by the certificates in the ownership voucher may conform the operation of the data processing system to that expected by the owner.

After secure onboarding 230, data processing system 102 may begin to operate. For example, data processing system 102 may perform first boot configuration 240. During first boot configuration 240, data processing system 102 may resolve (e.g., validate, and apply various changes specified by the certificates) the certificates stored on it to identify how it will operate. For example, data processing system may establish security configurations 242 (e.g., that may limit booting, software that may execute, etc.), hardware policies 244 (e.g., settings for hardware devices), and an owner's key 246 (e.g., usable to ascertain whether to follow signed instructions from a control plane). These data structures may guide the operation of data processing system 102 post onboarding.

Once first boot configuration 240 is complete, data processing system 102 may enter system operation 250 phase. During system operation 250, the configurations and/or other changes (e.g., identification of public keys to which authority has been delegated) made during first boot configuration 240 may be used to manage (i) operation of a basic input output system (BIOS) and extensive firmware interface (EFI) keys 252, (ii) operation/verification of hardware (254), and/or (iii) installation of software 256 (e.g., specified by the software loadout/management agent and/or local control plane via instructions signed by the local control plane an verified with the designed public key). By doing so, the operation of data processing system 102 may be conformed to the expectations of the new owner using a verifiable set of certificates with authority delegated from the root of trust (e.g., the manufacturer).

Thus, as illustrated in FIG. 2B, the framework for managing data processing systems in accordance with embodiments disclosed herein may facilitate restricting operation of the data processing system prior to onboarding to reduce the risk of compromise, while also allowing for seamless onboarding and placing the data processing system into compliance with the ultimate owner of the data processing system.

As discussed above, various components of the system of FIG. 1 may perform various methods for managing a data processing system. FIGS. 3-4 show methods that may be performed to secure data processing systems that provide computer implemented services prior to, during, and/or after joining a system owned by an owner. While FIGS. 3-4 are illustrated with operations in a specific order, the operations may be performed in different orders, any of the operations may be omitted, additional operations (not shown) may be performed, and/or any of the operations may be performed in a parallel or partially overlapping in time manner with respect to other operations.

Turning to FIG. 3, a flow diagram illustrating a method for managing a data processing system in accordance with an embodiment is shown. The method illustrated in FIG. 3 may be performed, for example, by a management service and/or other components of the system of FIG. 1.

At operation 302, an initial security policy is deployed to a data processing system. The initial security policy may be deployed by storing it in the data processing system. For example, the initial security policy may be deployed once the data processing system is manufactured. The initial security policy may be deployed onto the data processing system at any time during and/or after manufacturing of the data processing system.

The initial security policy may include a first public key that defines authority over the data processing system. The initial security policy may also specify various restrictions on operation of the data processing system. For example, the initial security policy may restrict the basic input/output system of the data processing system thereby placing the data processing system into a first security state.

In an embodiment, the data processing system, when in the first security state, may (i) be restricted boot options for the data processing system, (ii) lack access to certain ports that serve as an interface between the data processing system and other computing devices (e.g., peripheral devices), (iii) restrict the use of extensible firmware interface (EFI) keys, and/or (iv) restrict other computer implemented services provided by the data processing system.

At operation 304, an ownership voucher for the data processing system is obtained. The ownership voucher may be obtained by generating it. The ownership voucher may be generated by (i) collecting information regarding changes in authority, policies, credentials, management agents, and/or other types of information from a future owner of a data processing system, (ii) generating one or more certificates based on the obtained information, and (iii) adding the certificates and/or portions of the information to an ownership voucher (e.g., a template data structure). Refer to FIG. 4 for additional details regarding obtaining of an ownership voucher.

At operation 306, the ownership voucher is deployed to the data processing system. The ownership may be deployed during an onboarding of the data processing system to a system of an owner of the data processing system. The ownership voucher may be deployed by sending a copy of the ownership voucher to the data processing system.

Deploying the ownership voucher to the data processing system may cause the data processing system to consume and validate the certificates. For certificates that can be validated, the data processing system may modify its operation to conform to the changes policies specified by the certificates. For example, as noted above, the changes to security policies specified by validated certificates may conform the operation of the data processing system to that expected by an owner of a system to which the data processing system is joining through onboarding.

The method may end following operation 306.

Turning to FIG. 4, a flow diagram illustrating methods for obtaining an ownership voucher in accordance with an embodiment is shown. The method illustrated in FIG. 4 may be performed, for example, by management service and/or other components of the system of FIG. 1.

At operation 402, a second public key from an owner of a data processing system is obtained. The second public key may be obtained by receiving it from the owner. For example, the owner may provide a copy of the second public key when the data processing system is purchased.

At operation 404, credentials (e.g., for system access) for the data processing system are obtained. These credentials may be obtained from a control-plane of the system (e.g., control-plane 106 from FIG. 1) that the data processing system may be joining. In an embodiment, the intended owner provides the credentials as part completion of a purchase transaction for the data processing system.

At operation 406, information (e.g., security policies) regarding the security framework implemented by the owner is obtained. The information may be obtained by receiving it from an owner, from a control-plane of the system to which the data processing system will join, and/or via other methods.

At operation 408, an ownership certificate indicating ownership of the data processing system is generated. The ownership certificate may be obtained through generation of the ownership certificate.

At operation 410, a hardware certificate indicating configurations for hardware components of the data processing system is obtained. The hardware certificate may be obtained through generation of the hardware certificate.

At operation 412, a management agent that indicates software components designated by the owner of the data processing system is obtained. The management agent may be obtained by receiving it from the owner, a control-plane of the system to which the data processing system will join, and/or from other entities.

At operation 414, an ownership voucher is obtained using the second public key, the information, the second security policy, security framework information, the ownership certificate, the hardware certificate, and the management agent. The ownership voucher may be obtained by generating a data structure based on and/or that includes all or a portion of the aforementioned data structures.

The method may end following operation 414.

Using the methods illustrated in FIGS. 3-4, a system in accordance with an embodiment may reduce the risk of compromise of data processing system prior to, during, and/or after onboarding to a system.

Any of the components illustrated in FIGS. 1-4 may be implemented with one or more computing devices. Turning to FIG. 5, a block diagram illustrating an example of a data processing system (e.g., a computing device) in accordance with an embodiment is shown. For example, system 510 may represent any of data processing systems described above performing any of the processes or methods described above. System 510 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 510 is intended to show a high level view of many components of the computer system. However, it is to be understood that additional components may be present in certain implementations and furthermore, different arrangement of the components shown may occur in other implementations. System 510 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 510 includes processor 511, memory 513, and devices 515-517 via a bus or an interconnect 520. Processor 511 may represent a single processor or multiple processors with a single processor core or multiple processor cores included therein. Processor 511 may represent one or more general-purpose processors such as a microprocessor, a central processing unit (CPU), or the like. More particularly, processor 511 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 511 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 511, which may be a low power multi-core processor socket such as an ultra-low voltage processor, may act as a main processing unit and central hub for communication with the various components of the system. Such processor can be implemented as a system on chip (SoC). Processor 511 is configured to execute instructions for performing the operations discussed herein. System 510 may further include a graphics interface that communicates with optional graphics subsystem 514, which may include a display controller, a graphics processor, and/or a display device.

Processor 511 may communicate with memory 513, which in one embodiment can be implemented via multiple memory devices to provide for a given amount of system memory. Memory 513 may include one or more volatile storage (or memory) devices such as random access memory (RAM), dynamic RAM (DRAM), synchronous DRAM (SDRAM), static RAM (SRAM), or other types of storage devices. Memory 513 may store information including sequences of instructions that are executed by processor 511, or any other device. For example, executable code and/or data of a variety of operating systems, device drivers, firmware (e.g., input output basic system or BIOS), and/or applications can be loaded in memory 513 and executed by processor 511. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 510 may further include IO devices such as devices (e.g., 515, 515, 517, 518) including network interface device(s) 515, optional input device(s) 515, and other optional IO device(s) 517. Network interface device(s) 515 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 515 may include a mouse, a touch pad, a touch sensitive screen (which may be integrated with a display device of optional graphics subsystem 514), a pointer device such as a stylus, and/or a keyboard (e.g., physical keyboard or a virtual keyboard displayed as part of a touch sensitive screen). For example, input device(s) 515 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity data collector arrays or other elements for determining one or more points of contact with the touch screen.

IO devices 517 may include an audio device. An audio device may include a speaker and/or a microphone to facilitate voice-enabled functions, such as voice recognition, voice replication, digital recording, and/or telephony functions. Other IO devices 517 may further include universal serial bus (USB) port(s), parallel port(s), serial port(s), a printer, a network interface, a bus bridge (e.g., a PCI-PCI bridge), data collector(s) (e.g., a motion data collector such as an accelerometer, gyroscope, a magnetometer, a light data collector, compass, a proximity data collector, etc.), or a combination thereof. IO device(s) 517 may further include an imaging processing subsystem (e.g., a camera), which may include an optical data collector, such as a charged coupled device (CCD) or a complementary metal-oxide semiconductor (CMOS) optical data collector, utilized to facilitate camera functions, such as recording photographs and video clips. Certain data collectors may be coupled to interconnect 520 via a data collector hub (not shown), while other devices such as a keyboard or thermal data collector may be controlled by an embedded controller (not shown), dependent upon the specific configuration or design of system 510.

To provide for persistent storage of information such as data, applications, one or more operating systems and so forth, a mass storage (not shown) may also couple to processor 511. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, a flash device may be coupled to processor 511, e.g., via a serial peripheral interface (SPI). This flash device may provide for non-volatile storage of system software, including a basic input/output software (BIOS) as well as other firmware of the system.

Storage device 518 may include computer-readable storage medium 519 (also known as a machine-readable storage medium or a computer-readable medium) on which is stored one or more sets of instructions or software (e.g., processing module, unit, and/or processing module/unit/logic 538) embodying any one or more of the methodologies or functions described herein. Processing module/unit/logic 538 may represent any of the components described above. Processing module/unit/logic 538 may also reside, completely or at least partially, within memory 513 and/or within processor 511 during execution thereof by system 510, memory 513 and processor 511 also constituting machine-accessible storage media. Processing module/unit/logic 538 may further be transmitted or received over a network via network interface device(s) 515.

Computer-readable storage medium 519 may also be used to store some software functionalities described above persistently. While computer-readable storage medium 519 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 538, components and other features described herein can be implemented as discrete hardware components or integrated in the functionality of hardware components such as ASICS, FPGAs, DSPs or similar devices. In addition, processing module/unit/logic 538 can be implemented as firmware or functional circuitry within hardware devices. Further, processing module/unit/logic 538 can be implemented in any combination hardware devices and software components.

Note that while system 510 is illustrated with various components of a data processing system, it is not intended to represent any particular architecture or manner of interconnecting the components as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing security of a data processing system, the method comprising:
    deploying, by a management service, an initial security policy to the data processing system, the initial security policy comprising a public key of a first party and placing the data processing system into a first security state, the first party is a manufacturer of the data processing system, and the initial security policy secures the data processing system against compromise while in a channel of commerce;
    generating, by the management service, an ownership voucher for the data processing system, the ownership voucher comprising:
        a second security policy, the second security policy being signed and verifiable using the public key of the first party, the second security policy specifying a change from the first security state, and the second security policy being based on information regarding a security framework implemented by an owner of the data processing system, a cryptographically verifiable delegation of authority over the data processing system to a second party, the cryptographically verifiable delegation comprising a public key of the second party, the second party is the owner of the data processing system after purchase from the channel of commerce, and the second security policy places the data processing system into compliance with the security framework implemented by the owner, an ownership certificate indicating that the owner owns the data processing system, a hardware certificate indicating configurations for hardware components of the data processing system, credentials for the data processing system to allow the data processing system to join a domain indicated by the owner, and a management agent that indicates a software component designated by the owner for the data processing system; and deploying, by the management service and during an onboarding of the data processing system by the second party, the ownership voucher to the data processing system to update the data processing system into a second security state specified by a change from the first security state to place the data processing system in compliance with a security framework implemented by the second party.

2. The method of claim 1, wherein the first security state is hardened against attacks on the security of the data processing system, and the second security state is less restrictive than the first security state.

3. The method of claim 1, wherein the ownership voucher further comprises:

a third security policy, the third security policy being signed and verifiable using a public key of the second party, and the third security policy specifying a change from the second security state.

4. The method of claim 3, wherein the second security policy further comprises:

a public key of the second party.

5. The method of claim 4, wherein the public key of the second security policy delegates authority over changes in security policies implemented by the data processing system to the second party, and the public key of the second security policy requires that any changes to the second security state be signed by the second party and verifiable with the public key of the second security policy.

6. The method of claim 1, further comprising:

obtaining, by the management service, a second public key from the owner;

obtaining, by the management service, the information regarding the security framework implemented by the owner;

generating, by the management service and using the second public key and the information, the second security policy; and generating, by the management service and using the second security policy, the ownership voucher.

7. The method of claim 1, wherein the initial security policy specifies:

a change in Extensible Firmware Interface (EFI) keys used to manage startup of the data processing system.

8. The method of claim 1, wherein the initial security policy authorizes a smaller number of types of boots for the data processing system than then the second security policy.

9. A non-transitory machine-readable medium having instructions stored therein, which when executed by a processor, cause the processor to perform operations for managing security of a data processing system, the operations comprising:

deploying, by a management service, an initial security policy to the data processing system, the initial security policy comprising a public key of a first party and placing the data processing system into a first security state, the first party is a manufacturer of the data processing system, and the initial security policy secures the data processing system against compromise while in a channel of commerce;

generating, by the management service, an ownership voucher for the data processing system, the ownership voucher comprising:

a second security policy, the second security policy being signed and verifiable using the public key of the first party, the second security policy specifying a change from the first security state, and the second security policy being based on information regarding a security framework implemented by an owner of the data processing system, a cryptographically verifiable delegation of authority over the data processing system to a second party, the cryptographically verifiable delegation comprising a public key of the second party, the second party is the owner of the data processing system after purchase from the channel of commerce, and the second security policy places the data processing system into compliance with the security framework implemented by the owner, an ownership certificate indicating that the owner owns the data processing system, a hardware certificate indicating configurations for hardware components of the data processing system, and credentials for the data processing system to allow the data processing system to join a domain indicated by the owner, and a management agent that indicates a software component designated by the owner for the data processing system; and deploying, by the management service and during an onboarding of the data processing system by the second party, the ownership voucher to the data processing system to update the data processing system into a second security state specified by a change from the first security state to place the data processing system in compliance with a security framework implemented by the second party.

10. The non-transitory machine-readable medium of claim 9, wherein the first security state is hardened against attacks on the security of the data processing system, and the second security state is less restrictive than the first security state.

11. The non-transitory machine-readable medium of claim 9, wherein the operations further comprise:

obtaining, by the management service, a second public key from the owner;

obtaining, by the management service, the information regarding the security framework implemented by the owner;

generating, by the management service and using the second public key and the information, the second security policy; and generating, by the management service and using the second security policy, the ownership voucher.

12. A data processing system, comprising:

a processor; and a memory coupled to the processor to store instructions, which when executed by the processor, cause the processor to perform operations for managing security of a data processing system, the operations comprising:

deploying, by a management service, an initial security policy to the data processing system, the initial security policy comprising a public key of a first party and placing the data processing system into a first security state, the first party is a manufacturer of the data processing system, and the initial security policy secures the data processing system against compromise while in a channel of commerce;

generating, by the management service, an ownership voucher for the data processing system, the ownership voucher comprising:

a second security policy, the second security policy being signed and verifiable using the public key of the first party, the second security policy specifying a change from the first security state, and the second security policy being based on information regarding a security framework implemented by an owner of the data processing system, and a cryptographically verifiable delegation of authority over the data processing system to a second party, the cryptographically verifiable delegation comprising a public key of the second party, the second party is the owner of the data processing system after purchase from the channel of commerce, and the second security policy places the data processing system into compliance with the security framework implemented by the owner, an ownership certificate indicating that the owner owns the data processing system, a hardware certificate indicating configurations for hardware components of the data processing system, credentials for the data processing system to allow the data processing system to join a domain indicated by the owner, and a management agent that indicates a software component designated by the owner for the data processing system; and deploying, by the management service and during an onboarding of the data processing system by the second party, the ownership voucher to the data processing system to update the data processing system into a second security state specified by a change from the first security state to place the data processing system in compliance with a security framework implemented by the second party.

13. The data processing system of claim 12, wherein the first security state is hardened against attacks on the security of the data processing system, and the second security state is less restrictive than the first security state.

14. The data processing system of claim 12, wherein the operations further comprise:

obtaining, by the management service, a second public key from the owner;

obtaining, by the management service, the information regarding the security framework implemented by the owner;

generating, by the management service and using the second public key and the information, the second security policy; and generating, by the management service and using the second security policy, the ownership voucher.

15. The non-transitory machine-readable medium of claim 9, wherein the ownership voucher further comprises:

a third security policy, the third security policy being signed and verifiable using a public key of the second party, and the third security policy specifying a change from the second security state.

16. The non-transitory machine-readable medium of claim 15, wherein the second security policy further comprises:

a public key of the second party.

17. The non-transitory machine-readable medium of claim 16, wherein the public key of the second security policy delegates authority over changes in security policies implemented by the data processing system to the second party, and the public key of the second security policy requires that any changes to the second security state be signed by the second party and verifiable with the public key of the second security policy.

18. The data processing system of claim 12, wherein the ownership voucher further comprises:

a third security policy, the third security policy being signed and verifiable using a public key of the second party, and the third security policy specifying a change from the second security state.

19. The data processing system of claim 18, wherein the second security policy further comprises:

a public key of the second party.

20. The data processing system of claim 19, wherein the public key of the second security policy delegates authority over changes in security policies implemented by the data processing system to the second party, and the public key of the second security policy requires that any changes to the second security state be signed by the second party and verifiable with the public key of the second security policy.

* * * * *